United States Patent
Margulis

(10) Patent No.: US 7,877,488 B1
(45) Date of Patent: Jan. 25, 2011

(54) AUTOMATIC SET UP FOR EDITING A WEB SITE

(75) Inventor: Joshua K. Margulis, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 301 days.

(21) Appl. No.: 11/841,428

(22) Filed: Aug. 20, 2007

Related U.S. Application Data

(62) Division of application No. 10/689,870, filed on Oct. 21, 2003, now Pat. No. 7,263,534.

(51) Int. Cl.
G06F 15/16 (2006.01)
(52) U.S. Cl. .................................. 709/227; 709/217
(58) Field of Classification Search ......... 709/201–203, 709/217–219
See application file for complete search history.

(56) References Cited

U.S. PATENT DOCUMENTS

| | | | |
|---|---|---|---|
| 5,572,643 A | 11/1996 | Judson | |
| 5,778,389 A * | 7/1998 | Pruett et al. | 707/204 |
| 5,892,908 A | 4/1999 | Hughes et al. | |
| 6,012,071 A | 1/2000 | Krishna et al. | |
| 6,061,692 A | 5/2000 | Thomas et al. | |
| 6,061,697 A | 5/2000 | Nakao | |
| 6,078,929 A | 6/2000 | Rao et al. | |
| 6,145,003 A | 11/2000 | Sanu et al. | |
| 6,148,289 A * | 11/2000 | Virdy | 707/3 |
| 6,167,453 A | 12/2000 | Becker et al. | |
| 6,385,606 B2 | 5/2002 | Inohara et al. | |
| 6,393,420 B1 * | 5/2002 | Peters | 707/102 |
| 6,516,337 B1 | 2/2003 | Tripp et al. | |
| 6,519,626 B1 | 2/2003 | Soderburg et al. | |
| 6,626,957 B1 | 9/2003 | Lippert et al. | |
| 6,629,127 B1 | 9/2003 | Deen et al. | |
| 6,823,478 B1 * | 11/2004 | Prologo et al. | 714/38 |
| 6,944,658 B1 | 9/2005 | Schneider | |
| 6,959,288 B1 | 10/2005 | Medina et al. | |
| 6,985,936 B2 | 1/2006 | Agarwalla et al. | |
| 6,990,629 B1 | 1/2006 | Heaney et al. | |
| 7,032,000 B2 | 4/2006 | Tripp | |
| 7,062,506 B2 | 6/2006 | Taylor et al. | |

(Continued)

OTHER PUBLICATIONS

U.S. Appl. No. 10/690,980, K.P. Sundermeyer et al.

(Continued)

*Primary Examiner*—Joseph E Avellino
*Assistant Examiner*—Jenee Williams
(74) *Attorney, Agent, or Firm*—Kilpatrick Stockton LLP

(57) ABSTRACT

A system and method is disclosed for automatically setting up a Web site for editing. One embodiment of such a system and method may comprise selecting a common file transfer path from a plurality of common file transfer paths, generating a test file, writing the test file to a storing computer through the file transfer server using the selected common file transfer path, requesting the test file from a Web server hosting the Web site, determining the common file transfer path is valid when the test file is received from the Web server responsive to the requesting, and selecting another common file transfer path from the plurality of common file transfer paths when the test file is not received from the Web server, wherein the method is repeated from the generating step using another common file transfer path.

17 Claims, 2 Drawing Sheets

U.S. PATENT DOCUMENTS

| | | | |
|---|---|---|---|
| 7,086,050 | B2 | 8/2006 | Barton et al. |
| 7,117,504 | B2 | 10/2006 | Smith et al. |
| 7,213,201 | B2 | 5/2007 | Brown et al. |
| 7,263,534 | B1 | 8/2007 | Margulis |
| 7,269,664 | B2 | 9/2007 | Hutsch et al. |
| 7,281,060 | B2 | 10/2007 | Hofmann et al. |
| 7,287,227 | B2 | 10/2007 | Ries et al. |
| 7,448,032 | B2 | 11/2008 | Boubonnais |
| 7,457,805 | B2 | 11/2008 | Deen et al. |
| 7,480,910 | B1 * | 1/2009 | Kuwamoto et al. ......... 709/219 |
| 2001/0002470 | A1 * | 5/2001 | Inohara et al. ................. 707/1 |
| 2002/0023112 | A1 * | 2/2002 | Avital ......................... 707/513 |
| 2003/0023632 | A1 | 1/2003 | Ries et al. |
| 2003/0061278 | A1 | 3/2003 | Agarwalla et al. |
| 2003/0167317 | A1 | 9/2003 | Deen et al. |
| 2003/0220924 | A1 | 11/2003 | Bourbonnais |
| 2004/0177321 | A1 | 9/2004 | Brown et al. |

OTHER PUBLICATIONS

U.S. Appl. No. 10/690,214, M.J. Sundermeyer et al.
U.S. Appl. No. 10/689,860, D.P. Brown.
Office Action dated Nov. 8, 2005 in related U.S. Appl. No. 10/690,980.
Office Action dated Feb. 27, 2006 in related U.S. Appl. No. 10/690,980.
Office Action dated Jul. 27, 2006 in related U.S. Appl. No. 10/690,980.
Office Action dated Dec. 15, 2006 in related U.S. Appl. No. 10/690,980.
Examiner's Answer to Appeal Brief dated Jul. 30, 2007 in related U.S. Appl. No. 10/690,980.
Decision of BPAI dated Jul. 31, 2009 in U.S. Appl. No. 10/690,980.
Office Action dated Oct. 18, 2006 in related U.S. Appl. No. 10/689,870.
Notice of Allowance dated Apr. 23, 2007 in related U.S. Appl. No. 10/689,670.
Office Action dated Mar. 21, 2006 in related U.S. Appl. No. 10/690,214.
Office Action dated Sep. 8, 2006 in related U.S. Appl. No. 10/690,214.
Examiner's Answer to Appeal Brief dated May 31, 2007 in related U.S. Appl. No. 10/690,214.
Office Action dated May 16, 2007 in related U.S. Appl. No. 10/689,860.
Office Action dated Nov. 1, 2007 in related U.S. Appl. No. 10/689,860.
Interview Summary dated Mar. 6, 2008 in related U.S. Appl. No. 10/689,860.
Office Action dated May 5, 2008 in related U.S. Appl. No. 10/689,860.
Office Action dated Oct. 31, 2008 in related U.S. Appl. No. 10/689,860.
Office Action dated Aug. 19, 2009 in related U.S. Appl. No. 10/689,860.
U.S. Appl. No. 11/019,101, filed Dec. 21, 2004.
Office Action dated Feb. 5, 2009 in related U.S. Appl. No. 11/019,101.
Berners-Lee, et al., "RFC 1738—Uniform Resource Locations (URL)"—Dec. 1994.
Dreamweaver TechNote 16416, "How to make an inherited editable region uneditable," Jul. 6, 2002, p. 1-4.
Macromedia Dreamweaver MX: Training from the Source, published Jul. 23, 200, Safari Tech Books Online version, http://proquest.safaribooksonline.com, p. 1-39.
Fraternali, P., "Tools and Approaches for Developing Data-Intensive Web Applications: A Survey," ACM Computing Surveys, vol. 31, Issue 3, Sep. 1999, p. 227-263.
Altova Inc. & Altova GmbH, "XML Spy 4.0 Manual," copyright 1998-2001, Chapter 3, consisting of pp. 91-286.
GlobalScape, "CuteFTP Pro Technical Overview," White Paper, May 22, 2001, published on the Internet at least by Aug. 14, 2002 from: http://web.archive.org/web/20020814133509/www.globalscape.com/support/manuals.shtml, pp. i-ii and 1-17.
Kim, L., "XML Spy, XML Integrated Development Environments, Accelerating XML Application Development in the Enterprise," Altova Inc. & Altova GmbH 2002, published on the Internet as of Aug. 21, 2002, from link to: http://web.archive.org/web/20020802160016/www.www.xmispy.com/resources_wp.html, pp. 1-20.
GlobalScape, "CuteFTP Pro, User'sGuide," published on the Internet as of Aug. 14, 2002, from link to: http://web.archive.org/web/20020814133509/www.globalscape.com/support/manuals.shtml, downloaded pp. 1-108.
Xiasoft, "Streamlining content creation, retrieval, and publishing on the Web, Using TEXTML Server and XML Spy 4 Suite in an integrated, Web publishing environment," White Paper, Jul. 2002, pp. 1-16.
Office Action dated Jun. 10, 2010 in U.S. Appl. No. 10/690,214.
Office Communication dated Nov. 6, 2009 in related U.S. Appl. No. 10/690,980.
Notice of Allowance dated Feb. 5, 2010 in U.S. Appl. No. 10/689,860.
Office Action dated Oct. 15, 2009 in related U.S. Appl. No. 11/019,101.
Advisory Action dated Dec. 30, 2009 in related U.S. Appl. No. 11/019,101.
Decision of BPAI dated Sep. 4, 2009 in related U.S. Appl. No. 10/690,214.
Final Office Action mailed Dec. 29, 2009 in related U.S. Appl. No. 10/690,214.
Macromedia Dreamweaver MX: Training from the Source, published Jul. 23, 2002, Safari Tech Books Online version, http://proquest.safaribooksonline.com, p. 1-39.
Final Office Action mailed Jul. 22, 2010 in U.S. Appl. No. 11/019,101.

* cited by examiner

AUTOMATIC SET UP FOR EDITING A WEB SITE

CROSS-REFERENCE TO RELATED APPLICATIONS

The present application is a divisional of U.S. patent application Ser. No. 10/689,870 entitled AUTOMATIC SET UP FOR EDITING A WEB SITE, the disclosure of which is hereby incorporated herein by reference. The present application is related to co-pending, and commonly assigned U.S. patent application Ser. No. 10/690,980, entitled, "CONTENT-RESTRICTED EDITING," U.S. patent application Ser. No. 10/690,214, entitled, "WEB SITE MANAGEMENT LIFECYCLE," and U.S. patent application Ser. No. 10/689,860, entitled, "CROSS-PROTOCOL URL MAPPING," the disclosures of which are hereby incorporated herein by reference.

TECHNICAL FIELD

The present invention relates, in general, to Web development systems, and, more specifically, to an automatic set up for editing a Web site.

BACKGROUND OF THE INVENTION

Companies typically use the World Wide Web to disseminate information both internally, to employees and contractors, and externally, to customers and business partners. This information is usually generated by subject matter experts (SMEs), who are typically people with expertise in the information domain, but who are not usually technically skilled. In order to publish this information to the Web, or edit the existing information already on a company Internet or Intranet Web site, SMEs typically work with technically skilled Web developers, who generally combine Web coding or computer programming skills and graphics design skills. Skilled Web developers are an expensive resource. Moreover, Web developers may divide the coding and graphics arts expertise into multiple people.

Web sites generally comprise a Web server, that serves the visual and data content to the user's browser many times in a format, such as hypertext markup language (HTML), and a file transfer server, that provides read and write-access to the files that make up the visual and data content of the Web sites. While Web servers and file transfer servers are conceptualized as separate and independent machines, Web servers and file transfer servers are typically only software applications, often times running on the same computer. The underlying Web files are usually stored in memory or storage accessible by the computer, and the Web server and file transfer server applications interact with those files in different ways. Web servers typically allow read-only access to the Web files, compared to the read/write-access allowed by the file transfer servers. Because the file transfer server allows read/write-access to Web files, general users are not typically given access to the file transfer server because changing files through the file transfer server will change how the Web pages are served through the Web server to the accessing browsers. Instead, file transfer server access is generally limited to Web developers or those who have some authority over the Web content. File transfer servers typically run a specific transfer protocol, such as file transfer protocol (FTP), secure FTP (SFTP), or the like. Additionally, the file transfer server may be set up on a local area network (LAN), or the like. For purposes of this application, file transfer servers will be referred to as FTP servers, even though it is not limited to running only FTP protocol.

Web development environments and development tools exist to assist the developers both retrieve and edit the underlying files that make up the Web pages. In order to access the Web files on the storing computer through the FTP server, a Web designer or developer is generally prompted by the server access application to provide the FTP host name, the FTP login, the FTP password, and the FTP path. While the FTP host, login, and password are usually the pieces of information that will get the user onto the FTP server, without the FTP path, a user will not likely find the location through which the FTP server accesses the underlying Web files on the computer. For most experienced designers or developers all of this information is relatively easy to know and/or obtain. A novice or non-technical user may know the FTP host name, login, and password, but would generally not know the FTP path; and, without the path, the FTP server will generally not allow access to the appropriate file locations. One solution for such novice or non-technical persons is to track down an information technology (IT) professional or other computer professional to obtain that information. Another solution is to simply hire an experienced designer to make the desired changes to the Web site. However, each of these current solutions comes at a cost of time and money; sometimes just to make a few minor changes or revisions to the Web site.

BRIEF SUMMARY OF THE INVENTION

One representative embodiment of the present invention is related to a system and method for automatically setting up a Web site for editing by a Web development environment. The development environment asks the user to supply the file transfer server host name, login, and password, in order to be able to access and log into the file transfer server. The development environment attempts to discover the Web server root directory name or path by heuristically attempting to write test or sample files to the file transfer server using a list or database of commonly used file transfer path or root directory names. Each time a sample file is written to a specific root directory, the development environment make a hypertext transfer protocol (HTTP) request to the Web server hosting the target Web site, to view the sample file. If the file transfer path or root directory name used was correct the Web server will return a read-only copy the correct file to the browser at the computer where the development environment is being run. However, if the path or directory name used was not correct, either an error message or a different file will be returned to the browser. The development environment recognizes this incorrect file or error message and uses the next available file transfer path or root directory name on the list. Each available common path or directory name is attempted until either the correct path or root directory is found, or the web development environment runs out of common names. When no more names are available, the user interface of the development environment resorts to requesting the correct path or root directory name from the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Web site maintenance is typically a time consuming and costly process. Even where small changes to the content of Web pages are made, development professionals typically are required to implement the changes due to their specific knowledge of the Web server/FTP server systems and, in the interest of preserving the format and design of the Web sites that they have spent considerable effort designing and implementing. A new technology developed by MACROMEDIA, INC., and described in co-pending, commonly-owned U.S. patent application Ser. No. 10/690,214, entitled, "WEB SITE MANAGEMENT LIFECYCLE," allows non-technical users to browse to a particular Web site or Web page in which the content is to be edited/deleted/added, click on a button to edit that Web page, after which the system seamlessly presents the editable file in the same visual window to the user who may then edit the Web file in the same screen, and then click on a publish button, after which the system seamlessly stores the underlying, now-edited, Web file back into the storing computer's memory or accessible storage media through the FTP server along with all of the necessary dependent files in the appropriate places on the storing computer system. This process generally occurs without the necessity that the user know the correct FTP server file transfer root directory name or the relationship between the Web server and the FTP server file systems. One problem in implementing this Web site management lifecycle is the discovery of the FTP server root directory name that points to the location of the Web files on the storing computer's memory.

Figure 1:
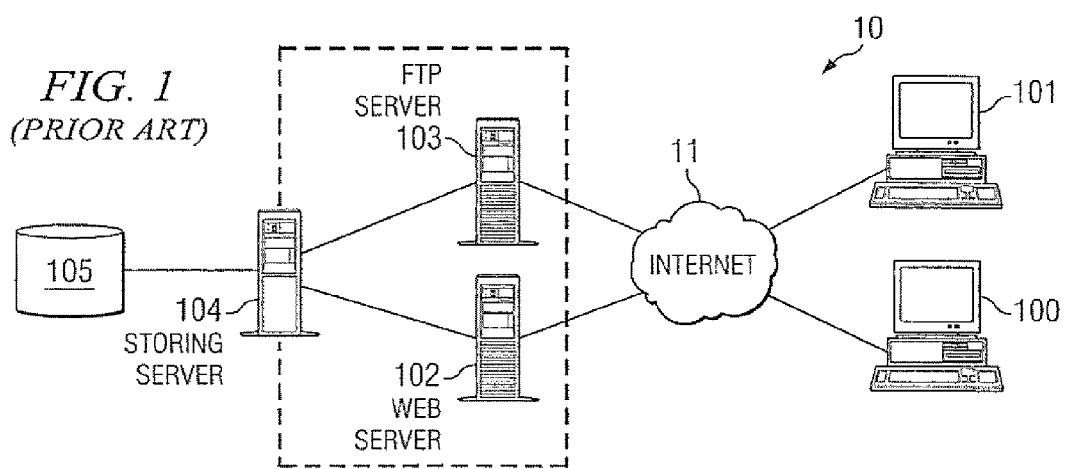
FIG. 1 is a block diagram illustrating a typical system for viewing Web sites and Web pages.

FIG. 1 is a block diagram illustrating typical system 10 for viewing Web sites and Web pages. A user at computer 100 and/or 101 may view a Web site hosted by Web server 102 by accessing Web server 102 over Internet 11. The browser at computer 100 requests the HTML or similar type Web files from Web server 102 using HTTP or other such. Web transfer protocol. Web server 102 then transmits the HTML along with copies of any necessary files from their storage locations on storing computer 104 or storage device 105 to the browser for rendering the Web page to the user. Web developers may access the actual Web files to change them through FTP server 103. FTP server 103 would generally access the Web files stored at storing computer 104 and/or storage device 105.

Figure 2:
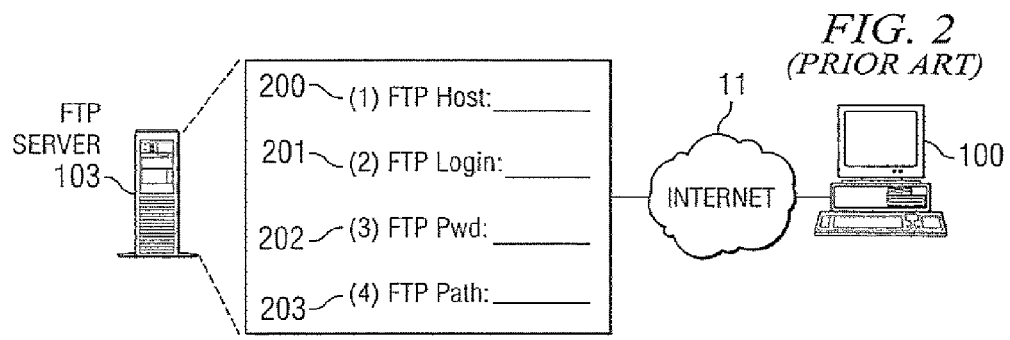
FIG. 2 is a block diagram detailing a connection route to an FTP server.

FIG. 2 is a block diagram detailing a connection route to FTP server 103. If the user at computer 100 desires to edit the Web page, he or she must download the underlying Web files through FTP server 103. However, in order to access FTP server 103, the developer, at computer 100, first enters information representing FTP host 200, login 201, password 202, and FTP path 203 for the Web site. Without any one of FTP host 200, login 201, and password 202, the developer would generally be denied access to FTP server 103. Furthermore, without FTP path 203, the developer would be practically unable to access any of the pertinent underlying Web files, regardless of whether the other information is available.

Figure 3:
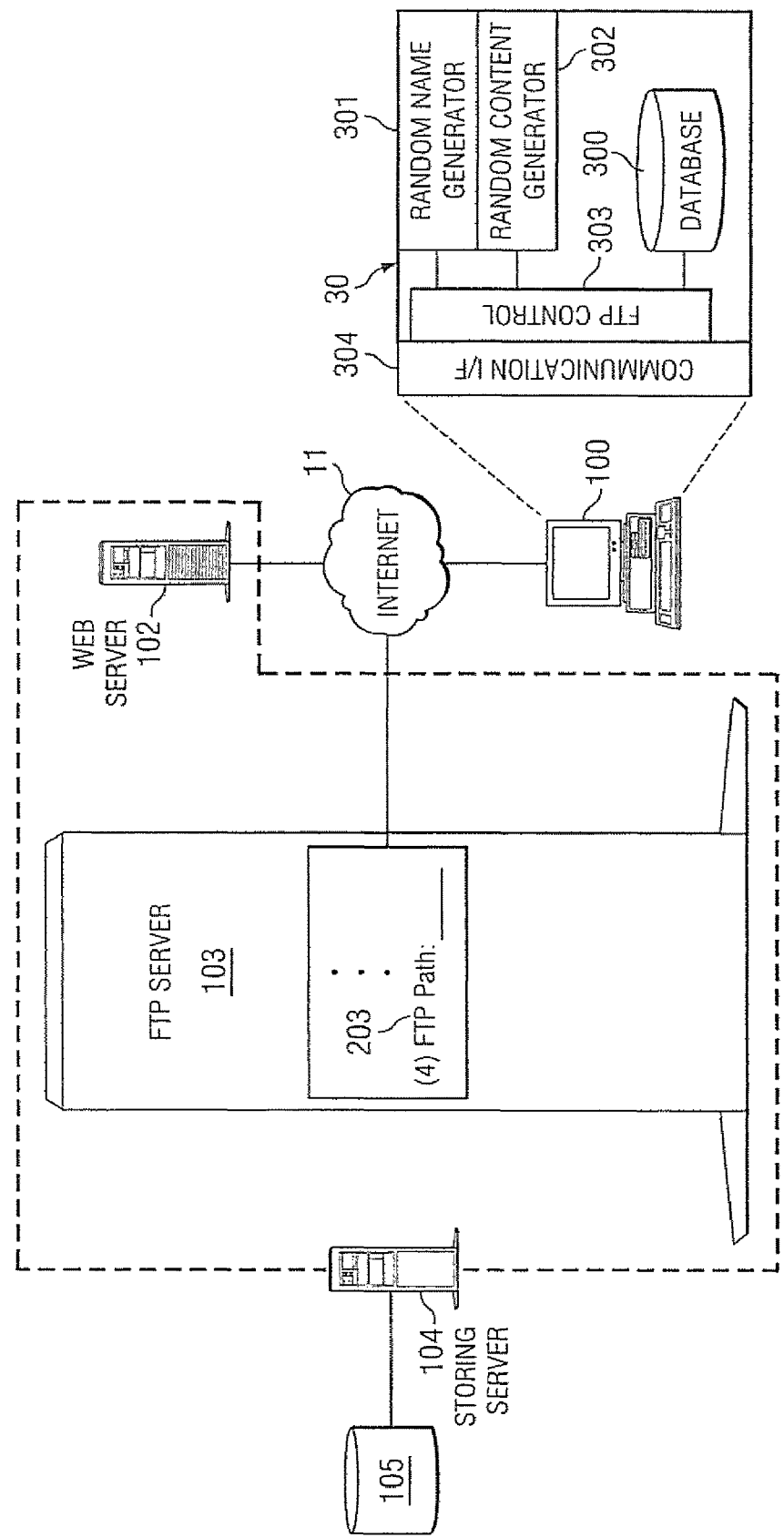
FIG. 3 is a block diagram illustrating one embodiment of the present invention operating on a computer.

FIG. 3 is a block diagram illustrating one embodiment of the present invention operating on computer 100. Development environment 30 resides on a memory of computer 100. A user, who may desire to edit a Web page serviced by FTP server 103, would start development environment 30 and indicate the preferences for the particular Web site or Web page to be edited. Development environment 30 requests the user to provide the FTP host 200, login 201, and password 202 information at initiation. Development environment 30 will then attempt to automatically discover the FTP path or Web server root directory without further intervention from the user.

Development environment 30 maintains database 300 in which a list of standard or common FTP path names is stored. Development environment 30 generates a test file using random name generator 301 and random content generator 302. FTP controller 303 then assembles the randomly created file and file name, and uses the first standard FTP path name from database 300 to attempt to write the test file to storing computer 104 or storage device 105 through FTP server 103 using communication interface 304. FTP controller 303 uses the other user-provided information along with standard FTP path from database 300 to gain access to FTP server 103 and write the random file. FTP controller 303 then requests Web server 102 to serve the test file back from storing computer 104 or storage device 105 to a browser at computer 100. If an error message is returned, FTP controller 303 determines that the first standard FTP path or root directory was incorrect. FTP controller 303 then accesses database 300 again to obtain the next standard or common FTP path or root directory name in the list and repeats the process. If, however, the test file is returned, FTP controller 303 verifies the content of that file, which was originally produced by random content generator 302. If the content matches, FTP controller determines that the FTP path or root directory name that was used was correct. FTP controller 303 may verify the test file by setting a validation flag or other such indicator. It should be noted that random file names and content may be used by FTP controller 303 in order to ensure that file names and content are not overlapped, in case a file of the same name actually exists on the computer storing the Web files already.

Figure 4:
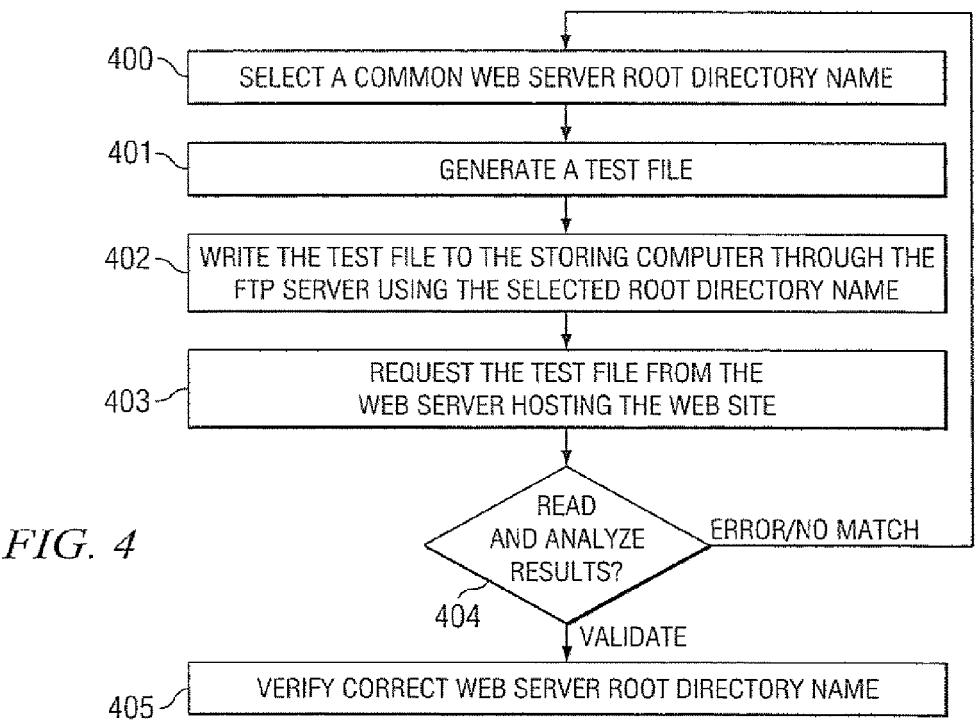
FIG. 4 is a flowchart illustrating steps taken in implementing one embodiment of the present invention.

FIG. 4 is a flowchart illustrating steps taken in implementing one embodiment of the present invention. In step 400, the FTP path or root directory name for an underlying Web site is selected based on a common FTP server path or root directory name. In step 401, a test file is generated. In selected embodiments, the test file may be generated using a random file name and content. The test file is pushed or written to the storing computer memory/storage through the FTP server in step 402 using the selected FTP server path or root directory name. Using the URL of the target Web site, an HTTP request is made to the Web server to serve the test file back to the developers browser in step 403. In step 404, the browser reads the result of the request from the Web server and determines whether the results returned from the Web server are error information, in which case the selected Web server path or root directory name is determined to be incorrect, or whether the results returned are the actual test file. If error information is received, then the process starts over at step 400 to select a new FTP path or root directory name. If, however, the correct test file is returned from the Web server responsive to the HTTP request, the FTP server path or root directory name is verified as correct in step 405.

It should be noted that in selected embodiments of the present invention, if the system unsuccessfully attempts to find the FTP path after going through each of the standard or common addresses or links, the user may be requested to provide such FTP path. However, selected embodiments of the present invention will only generally ask the user for the path name or root directory name after multiple such common or standard names are automatically attempted.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computing system comprising a processor and a computer-readable medium embodying program components that cause the computing system to provide a web development environment, the program components comprising:
    a file transfer controller that causes the computing system to:
        select a transfer path directory name from a set of transfer path directory names, the set comprising at least some of a plurality of transfer path directory names in stored in a database of transfer path directory names,
        provide a sample file to be written to a file transfer server using the selected transfer path directory name, and
        request a web server to return the sample file; and
    a file comparator that configures the computing system to compare said sample file as provided to the file transfer server to a returned file, if any;
    wherein said file transfer controller sets a validation flag if a file is returned and the returned file matches said sample file as provided, and
    wherein said file transfer controller causes the computing system to select a different transfer path directory name from said set of transfer path of directory names and provide a sample file using the selected different transfer path directory name until said validation flag is set or until each of said transfer path directory names of said set are used.

2. The system of claim 1 further comprising:
    a random name generator; and
    a random content generator;
    wherein said random name and content generators are used by said file transfer controller to assemble said sample file.

3. The system of claim 1 further comprising: a communication interface for controlling communication between said web development environment and at least one of the file transfer server and web server.

4. The system of claim 1 further comprising:
    a user interface that configures the computing system to receive input specifying a correct transfer path directory name after determining said set of transfer path directory names does not contain said correct transfer path directory name based on failure of the web server to return the sample file.

5. A non-transitory computer readable medium embodying software code that when executed by a computer causes the computer to perform the steps of:
    selecting a file transfer path from a set of file transfer paths, the set comprising at least some of a plurality of file transfer paths stored in a database accessible by the computer;
    generating a test file;
    writing said test file through a file transfer server using said selected file transfer path;
    requesting said test file from a server hosting a web site to be edited;
    comparing a file, if any, received in response to requesting and setting a validation flag if the received file matches the test file;
    determining said file transfer path is valid when said test file is received from said web server based on the validation flag; and
    if said test file is not received from said web server:
    selecting a second file transfer path from said set of file transfer paths, and
    repeating at least the writing, requesting, and determining steps, using the second file transfer path in the writing step when repeated until said validation flag is set or until each of said file transfer paths of said set are used.

6. The non-transitory computer readable medium of claim 5 wherein when executed by said computer said software code causes the computer to perform the further steps of:
    receiving file transfer server login information from a user; and
    using said login information in said writing said test file step.

7. The non-transitory computer readable medium of claim 5 wherein said generating said test file comprises:
    generating a randomized file name; and
    generating randomized content for said test file.

8. The non-transitory computer readable medium of claim 7 wherein
    comparing the received file comprises comparing a name of the returned file and content of the returned file to said randomized name and said randomized content,
    wherein the validation flag is set if the name of the returned file matches said randomized name and the content of the returned file matches said randomized content.

9. The non-transitory computer readable medium of claim 5 wherein when executed by said computer said software code causes the computer to perform the further step of:
    providing an interface to request said file transfer path when each of said plurality of file transfer paths of said set have been used.

10. A non-transitory computer readable medium embodying program components executable by a computing system to provide a web development environment, the program components comprising:
 a sample file generator that configures the computing system to generate a sample file, wherein generating the sample file comprises creating a random file name for said sample file and creating random data for said sample file;
 a controller that configures the computing system to:
  select a root directory name from a set of directory names, the set comprising at least some of a plurality of directory names stored in a database,
  push said sample file to said selected root directory name of a storing computer through a file transfer server,
  request retrieval of said sample file from a server hosting a web site to be edited,
  compare a retrieved file, if any, returned in response to the request to said random name and said random content,
  set a validation flag when said retrieved file matches said random name and said random content, and
  if the validation flag is not set:
 select a next directory name from said set of directory names and repeat at least the steps of pushing, requesting, comparing, and validating using said next directory name.

11. The non-transitory computer readable medium of claim 10 wherein said sample file generator comprises:
 a random name generator for creating the random file name for said sample file; and
 a random content generator for creating the random data for said sample file.

12. The non-transitory computer readable medium of claim 10 wherein said sample file generator and controller are comprised in a web development environment that resides on a memory of the computing system, the computing system communicatively coupled to a communication network through which at least one of said file transfer server and said web server is accessible.

13. The non-transitory computer readable medium of claim 10 further comprising:
 a user interface module that provides an interface for receiving input that specifies at least one of file transfer host, login, and password information.

14. The non-transitory computer readable medium set forth in claim 10, further comprising the database comprising the plurality of directory names.

15. The system set forth in claim 1, wherein the file transfer controller is configured to select, provide, and request in response to data indicating that the web development environment does not have access to data identifying a file transfer directory path corresponding to the root directory of the web server.

16. The non-transitory computer readable medium set forth in claim 5, further comprising prior to selecting, generating, writing, requesting, and determining said file transfer path is valid:
 determining that the web development environment does not have access to data identifying a file transfer directory path corresponding to the root directory of the web server.

17. The non-transitory computer readable medium set forth in claim 10, wherein the sample file generator and controller act in response to data indicating that the web development environment does not have access to data identifying a file transfer directory path corresponding to the root directory of the web server.

* * * * *